Patented July 13, 1926.

1,592,600

UNITED STATES PATENT OFFICE.

JOHN B. GORDON HICKMAN, OF BIRMINGHAM, ALABAMA.

FISHING FLY.

Application filed May 25, 1925. Serial No. 32,603.

My invention relates to an artificial fly and particularly to a fly that is adapted for both bass and bream fishing.

The fly in question contemplates the utilization of a double hackle, with a bass hook carrying the upper hackle and a smaller bream hook which depends below the lower hackle and is disposed between feathers also projecting below the hackles.

I have found by experience that the bream will strike the lower hook while the bass will generally strike and be caught by the larger upper hook, but when striking short they will be caught by the lower hook.

My invention contemplates the provision of the two hackles preferably in different colors to present a more attractive fly. The feathers which preferably are disposed on each side of the lower hook can be given any desired color, corresponding with either of the hackles, or differing from both.

The details of construction of my invention and the manner of its use will be better understood by reference to the following specification and to the accompanying drawings, which form a part thereof, and in which:—

Similar reference numerals refer to similar parts throughout the drawings.

Figure 1:
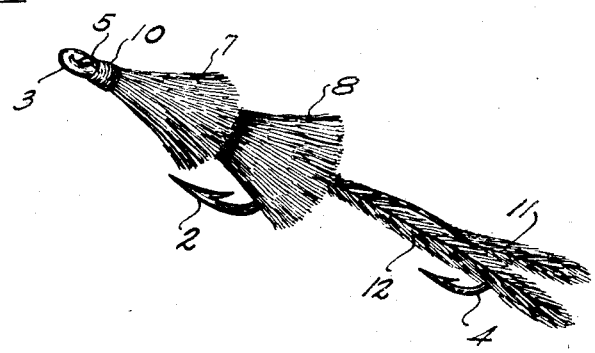
Fig. 1 is a view of the complete fly.
Figure 2:
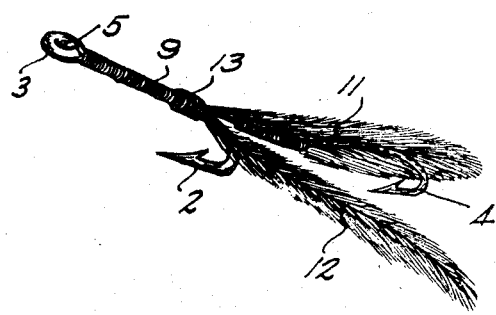
Fig. 2 shows the fly with the hackles removed.
Figure 3:
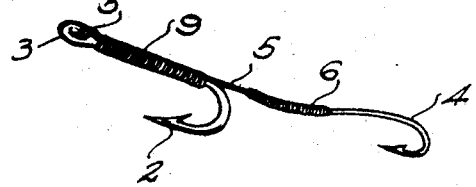
Fig. 3 is an assembly detail of the undressed hooks loosely connected.

In the embodiment of my invention illustrated, I show an upper hook 1 having a point 2 and an eye or equivalent terminal 3. A lower smaller hook 4 has a loop of gut 5 connected to its shank by a wrapping 6, the gut being passed through the eye 3 of the upper hook and wrapped to the shank of hook 1 by a wrapping 9. The upper hackle or dressing 7 is mounted at the upper end of the shank of the hook 1 by a wrapping 10 applied over the wrapping 9 and extends preferably to a point near the level of the tip 2 of the hook 1. I also mount on the shank of the hook 1 at a point within the upper hackle 7 a lower hackle 8 by means of a wrapping like 10 applied over the wrapping 9. This lower hackle 8 may be of the same or of a different color from the hackle 7. Before the hackles are mounted I provide two feathers 11 and 12 disposed on each side of the hook 4 and attached to the hook 1 by a wrapping 13 applied over the wrapping 9. It will be observed that the feathers and the lower end of the hook 4 project below the hackle 8, thus leaving the point of the lower hook dressed only by the two feathers.

Figure 4:
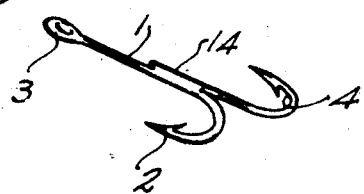
Fig. 4 is a detail of the bare hooks which are here shown as rigidly connected.

In Fig. 4 I show a modified type of hook in which the smaller hook 4 is not connected loosely by the gut 5 to the main hook but has its shank welded or rigidly secured thereto at 14. This type of hook will have the wrapping 9 with the feathers applied by the wrappings 13 and the two hackles mounted by their respective wrappings 10.

Having assembled the fly in the manner described, its use in fishing is as follows. When the fly is cast and drops upon the surface of the water, if the bass or trout strikes, it will strike at the hackles and generally be caught by the large hook 1, whereas if the bream strikes it will not as a general rule strike at the hackle but at the feathers and will be caught on the lower hook 4.

I have described the characteristics of the bass and bream in striking the hook in question because I am more familiar with that fishing, but it is obviously to be understood that the arrangement shown providing the upper hackle dressed hook and the lower smaller feather dressed hook will combine to produce a combination fly which is suited for a variety of fishing for which the present standard flies are not so suitable.

Though I have described with great particularity the details of the embodiment of the invention herein shown, it is not to be construed that I am limited thereto, as changes in arrangement and substitution of equivalents may be made by those skilled in the art without departing from the invention as defined in the appended claims.

Having thus described my invention, what I claim as new and desire to secure by Letters Patent, is:—

1. A fly comprising an upper hook with a hackle dressing, and a lower hook connected to the upper hook and provided with a feather dressing.

2. A fly comprising an upper hook having an eye for attachment to the line, a lower hook connected to the shank of the upper hook, an upper hackle dressing mounted on the upper hook's shank, a lower hackle dressing also mounted on the upper hook's shank and having its wrapping covered by the lower end of the upper hackle, and two feathers connected by a wrapping on the shank of the upper hook and serving as a dressing disposed on each side of the lower hook.

In testimony whereof I affix my signature.

JOHN B. GORDON HICKMAN.